UNITED STATES PATENT OFFICE.

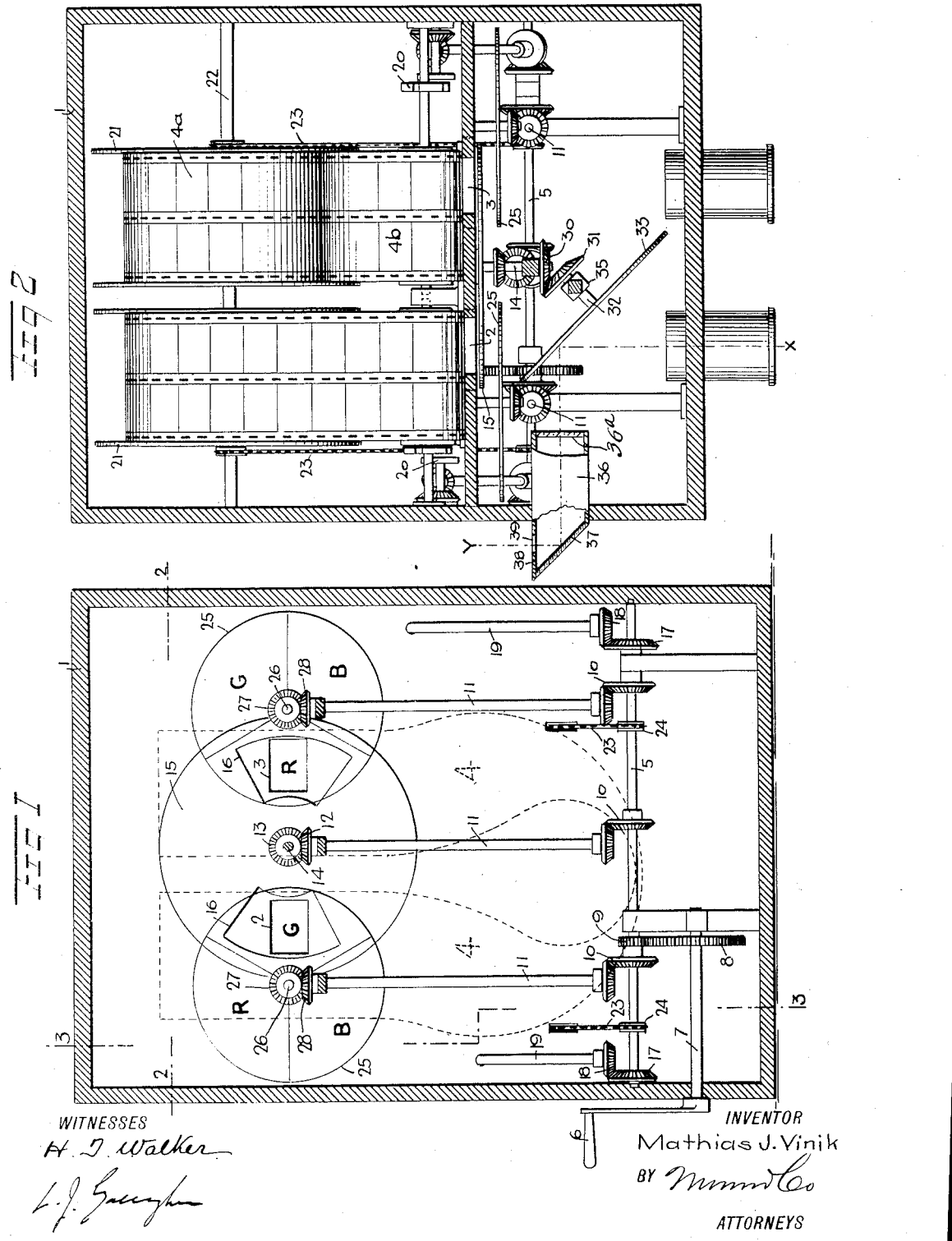

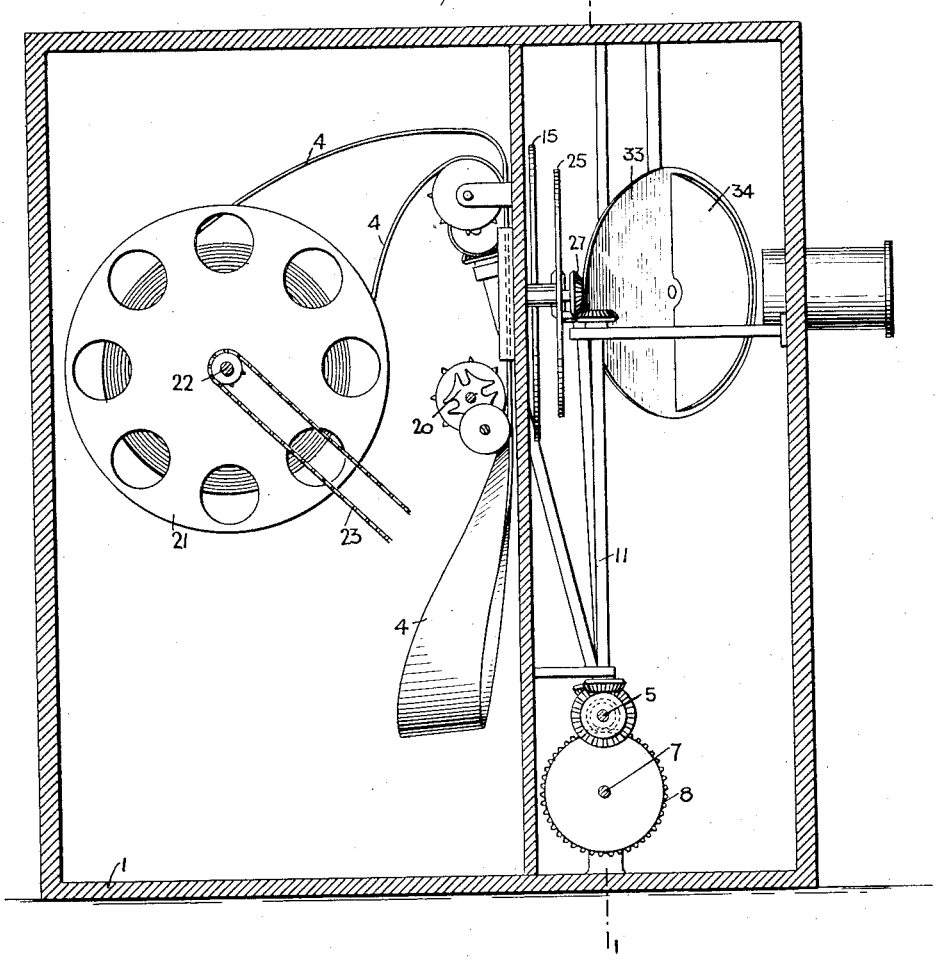

MATHIAS J. VINIK, OF NEW YORK, N. Y.

FINDER FOR CAMERAS.

1,218,342.  Specification of Letters Patent.  Patented Mar. 6, 1917.

Application filed December 31, 1912. Serial No. 739,468.

*To all whom it may concern:*

Be it known that I, MATHIAS J. VINIK, a subject of the Czar of Russia, and a resident of the city of New York, borough of Manhattan, in the county and State of New York, have invented a new and Improved Finder for Cameras, of which the following is a full, clear, and exact description.

This invention relates to cameras and more particularly to a finder whereby the photographer can obtain a view of a subject being photographed simultaneously with the taking of the picture, the invention being especially useful in moving picture machines, although it is not necessarily limited to this use.

The general object of the invention is to provide a comparatively simple, inexpensive and effective finder of this character which is reliable in operation and so designed as to be readily adaptable to moving picture cameras, the finder embodying a reflecting shutter located between the film or sensitized medium and the lens of the camera, so as to reflect the image of the subject being photographed, to a frosted glass on which the image can be seen by the photographer.

Reference is to be had to the accompanying drawings forming a part of this specification, in which like characters of reference indicate corresponding parts in all the views, and in which—

Figure 1 is a sectional view on the line 1—1 of Fig. 3, showing the camera in which the negative is carried, this mechanism being shown for purposes of explanation;

Fig. 2 is a sectional view thereof on the line 2—2 of Fig. 1;

Fig. 3 is a sectional view thereof on the line 3—3 of Fig. 1.

Referring now to Figs. 1 to 3, inclusive, in order to more fully set forth the manner of obtaining the film, the casing of the camera may be designated 1, the apertures in the front thereof as 2 and 3, the film of a certain width as 4, it being noted particularly from the said figures that the longitudinal half-portion of the film back of the aperture 2 is not the same longitudinal half-portion lying back of the aperture 3; extending transversely of the casing is a shaft 5, the handle 6 exteriorly of the casing being mounted on a shaft 7, whereby movement may be imparted to the shaft 5 through the gear and pinion 8—9. Mounted on the shaft 5 are a number of beveled gears 10 with which vertically extending shafts 11 engage, the middle shaft 11 carrying a beveled gear 12 at its upper end, meshing with a second beveled gear 13 mounted on a shaft 14, which also carries a shutter 15 having oppositely positioned openings 16 adapted to uncover the apertures 2 and 3 in front of the film simultaneously. Other beveled gears are also mounted on the said shaft 5 engaging gears 18 mounted on other shafts 19, the purpose of which is to operate the intermittent movements 20 within the camera, which intermittent movements may be of the type known as the Geneva or star wheel and pin movement. The film 4 used in this particular instance as above described, and after exposure, will consist of a succession of pictures $4^a$ obtained through the aperture 3, and a succession of pictures $4^b$ obtained through the aperture 2. The films are carried by suitable reels 21 mounted on a support 22, the winding and unwinding of the reels being obtained through the medium of a chain or belt 23 engaging a cog 24 on the first-mentioned shaft 5. As the handle 6 is operated the apertures 2—3 will be simultaneously uncovered and images will be formed successively on the half-portions of the film, the development of the films later resulting in the negative from which the positives may be made in different manners, to be subsequently set forth.

The manner of operation previously described results in the production of monochromatic films stereoscopically; in order to provide polychromatic pictures stereoscopically suitable color filters 25 may be rotatably mounted in front of the apertures 2 and 3, as shown in Figs. 1 and 2 particularly. Each filter is essentially a plate of transparent material, differently colored, green, red and blue, the filters being mounted on supports such as shafts 26 having beveled gears 27 meshing with beveled gears 28 at the upper ends of the vertically extending shafts 11 previously mentioned; the arrangement of the filters is such that the colors lying in front of the apertures 2 and 3 when these apertures are opened are not the same. If now, the camera is operated with the film therein in the manner described, and with the color filters as set forth, a succession of pictures $4^a$ will be obtained through the aperture 3, every fourth picture of which has been taken through the same color filter or screen, the other succession of pictures 4ᵇ being obtained through the aperture 2, each fourth picture likewise being obtained through the same filter or screen, it being noted, however, that since these successions of pictures are taken simultaneously one picture in the succession 4ᵃ is taken through a different color filter or screen than the same picture in the succession 4ᵇ; the result is that later combination of these simultaneously-taken pictures will produce a projection on the screen of a picture in natural colors provided suitable color filters are again made use of.

It may be noted by referring to Fig. 2 that the camera therein represented is provided with a new and improved mechanism whereby the finder of the camera will represent at any time the picture being formed on the film. The outer end of the shaft 14 which carries the beveled gear 13 on which the shutter 15 is mounted, carries a second beveled gear 30 with which a gear 31 meshes carried on a shaft 32 which extends angularly with respect to the vertical axis of the camera, the outer end of this shaft carrying a rotatable reflector 33 having an opening 34 (Fig. 3) therein, the shaft and reflector being mounted in any suitable manner, preferably on a standard or similar element 35. Adjacent one side of the camera casing is a tube 36, the inner end of which is closed with ground glass 36ᵃ and the other end of which is closed by a mirror 37 extending at substantially 45° from the vertical axis of the tube, that portion 38 of the tube outside of the casing being provided with an opening 39 opposite which is a mirror whereby any picture formed on the rotating reflector 33, when the unopened part of the reflector comes opposite the inner end of the tube 36, will also be formed on the ground glass and rendered visible through the opening because of the mirror; this reflector is articulated with the operating mechanism of the shutter, the open portion 34 of the reflector coming in front of the aperture 2 of the camera when the shutter in front of that aperture permits light rays to enter therethrough on to the film. The utility of the rotatable reflector is to permit the operator to see the images being formed on the film at such times as the closed part of the reflector comes into the path of the light rays entering the camera. The broken line $x$—$y$ of Fig. 2 brings out the path of the light rays during reflection.

Having thus described my invention, what I claim as new and desire to secure by Letters Patent is:—

1. A moving picture machine comprising a casing, an objective, a film supporting and driving mechanism behind the objective, a rotary reflector interposed between the objective and said mechanism and adapted to periodically intercept the rays of light passing through the objective and reflecting them laterally, and means in the wall of the machine through which the reflected rays of light can be seen to ascertain the images being photographed by the machine.

2. A moving picture machine comprising a film supporting and intermittent driving mechanism, film covering and uncovering means for intermittently exposing successive portions of the film, a reflector movable into the path of the rays of light intermittently and simultaneously with the covering of the said film by the first-mentioned means, and a finder disposed in the path of the reflected rays.

3. A moving picture machine comprising an objective, film-holding and intermittent driving means, a shutter disposed between the objective and film to cover and uncover the latter, a reflector disposed between the shutter and objective and operatively connected with the shutter to move into the path of the rays of light passing through the objective while the shutter covers the film, and a finder arranged to receive the reflected rays of light.

In testimony whereof I have signed my name to this specification in the presence of two subscribing witnesses.

MATHIAS J. VINIK.

Witnesses:
 MICHAEL W. BUSH,
 VINCENT WAITKUS.